US007146560B2

(12) United States Patent
Dang et al.

(10) Patent No.: US 7,146,560 B2
(45) Date of Patent: Dec. 5, 2006

(54) SYSTEMS AND METHODS FOR MANAGING IDENTITY INFORMATION

(75) Inventors: Chi-Thanh Dang, Tucson, AZ (US); Rambabu Achanta, Torrance, CA (US); Robert J. Hatton, Huntington Beach, CA (US); Kiranmayec Potnuru, Torrance, CA (US); Patricia Agbulos, Saugus, CA (US)

(73) Assignee: Xerox Corporation, Stamford, CT (US)

( * ) Notice: Subject to any disclaimer, the term of this patent is extended or adjusted under 35 U.S.C. 154(b) by 792 days.

(21) Appl. No.: 09/859,426

(22) Filed: May 18, 2001

(65) Prior Publication Data

US 2002/0174146 A1   Nov. 21, 2002

(51) Int. Cl.
G06F 17/00 (2006.01)
G06F 15/00 (2006.01)

(52) U.S. Cl. .................. 715/501.1; 715/513; 715/530; 715/540; 709/219

(58) Field of Classification Search ................ 715/515, 715/501.1, 513, 530–540; 709/219
See application file for complete search history.

(56) References Cited

U.S. PATENT DOCUMENTS 6,101,486 A * 8/2000 Roberts et al. ............... 705/27
6,128,655 A * 10/2000 Fields et al. ................ 709/219
6,286,043 B1 * 9/2001 Cuomo et al. .............. 709/223
6,421,733 B1 * 7/2002 Tso et al. .................... 709/246
6,463,440 B1 * 10/2002 Hind et al. .................. 707/102
6,675,216 B1 * 1/2004 Quatrano et al. ........... 709/229
6,715,129 B1 * 3/2004 Hind et al. .................. 715/513
6,751,778 B1 * 6/2004 Broman et al. ............. 715/517

OTHER PUBLICATIONS

Freire et al., "WebViews: Accessing Personalized Web Content and Services", Proceedings of the 10th International Conference on World Wide Web, published by ACM Press in 2001, pp. 576-586.*
Maglio et al., "Intermediaries Personalize Information Streams", Communications of the ACM, vol. 443, issue 8, published by ACM Press in Aug. 2000, pp. 96-101.*

* cited by examiner

Primary Examiner—William Bashore
(74) Attorney, Agent, or Firm—Oliff & Berridge, PLC

(57) ABSTRACT

Consistent identity information is provided for content information through the use of an identity manager. The identity manager stores styles and style elements and presentation information associated with a specific client identity. The styles and presentation information for each identity are stored based on client information. When a request for content is received, the information is retrieved. The styles and presentation information associated with the specific client identity are retrieved and merged with the content. The content and the client or user identity or look and feel information are integrated without expensive custom programming.

16 Claims, 6 Drawing Sheets

| 900 910 | 920 |
|---|---|
| www.xyz.com | <home><products><services><contact us> |
| www.xyz.com | <background="/xyz/logo.png"> |
| www.xyz.com | <submit="/XYZ/go.png"> |
| 140.147.254.3 | <submit="/loc/go.png"> |
| client_id=327468 | <submit="/zzz/go.png"> |

*FIG. 6*

| 950 910 | 930 |
|---|---|
| www.xyz.com | xsl:stylesheet version = "1.0"<br>xsl:stylesheet version = "1.0"<br>xmins:xsl="http//www.w3.org/1999/XSL/Transform"><br><font face = "arial"> |
| www.zyx.com | xsl:stylesheet version = "1.0"<br>xsl:stylesheet version = "1.0"<br>xmins:xsl="http//www.w3.org/1999/XSL/Transform"><br><font face = "times roman"> |
| www.xzy.com | xsl:stylesheet version = "1.0"<br>xsl:stylesheet version = "1.0"<br>xmins:xsl="http//www.w3.org/1999/XSL/Transform"><br><font face = "bookman"> |

*FIG. 7*

SYSTEMS AND METHODS FOR MANAGING IDENTITY INFORMATION

BACKGROUND OF THE INVENTION

1. Field of Invention

This invention relates to the managing of identity and style information.

2. Description of Related Art

The rapid expansion of the Internet and networking technologies has considerably reduced communications costs. However, this reduced cost has come at the expense of increased complexity in the design and maintenance of networked computer systems and networked applications. These costs have increased the total cost of ownership for many of these networked applications.

In response, many application service providers have attempted to reduce costs by maintaining the networked computer systems and applications necessary to support business functions, such as payment processing, invoicing, digital rights management, and content delivery, such as streaming audio and video. The application service provider develops expertise in providing access to the particular business functions and delivers access over a communication network such as the Internet.

For example, a referring web site requiring credit card authorization or debit card processing services may outsource that function to a payment processor application service provider. The payment processor maintains the service connections to the bank networks, clearing houses, American Express® and Visa®. The payment processor may use a secure protocol, such as https or the like. When a user of the web site selects the web site payment page, the request is referred to a secured web server, maintained by the payment processor for entry of the credit card information. In this way, the user's sensitive credit card information is not stored on the referring web site, security is increased and costs are lowered.

However, when the user of the web site is referred to the out-sourced page, the identity of the referring site is compromised. The user of the web site may experience problems since the out-sourced page may not support the same navigation functions as the referring site.

In response, many application service providers allow clients to specify certain format characteristics of the out-sourced page in an attempt to increase the perceived integration of the out-sourced page with the referring web site. For example, using custom programming techniques, a referring web site may specify the text colors used in the out-sourced page. This provides some degree of integration with the referring client site.

Some application service providers attempt to address these integration problems by requiring the user to design the page or content portion to be viewed. These application service providers merely provide information which the referring web site uses to build an appropriate page. This has the disadvantage in that the application service provider's expertise is not being fully exploited. For example, a payment processor may have already solved the problem of how to capture non-U.S. address information by initiating each transaction by first identifying the country information. An individual web site may not be aware of this problem until it cannot capture non-US address information.

SUMMARY OF THE INVENTION

Thus, systems and methods for managing style information that allow different identity or look and feel information to be applied to a content provider's content information would be useful.

The systems and methods for managing identity information according to this invention manage identity information by storing content elements and style sheet information associated with each determined client. Content elements associated with each referring web site client are used to form a skeleton or virtual content portion. The skeleton or virtual content portion is merged with content provider information. A style sheet associated with the referring web site client is applied to the merged content portion. The resulting merged content portion maintains the identity or look and feel of the referring web site client. The resulting content portion therefore maintains a consistent browsing experience for the end-user, which ensures the merged content is easy to use. The resulting merged content portion provides a consistent browsing experience, while also reducing the need for expensive and difficult to maintain custom programming.

These and other features and advantages of this invention are described in or are apparent from the following detailed description of the systems and methods according to this invention.

BRIEF DESCRIPTION OF THE DRAWINGS

Various exemplary embodiments of this invention will be described in detail, with reference to the following figures, wherein:

FIG. 6 shows an exemplary data structure for identity element storage according to this invention;

FIG. 7 shows an exemplary data structure for identity stylesheet storage according to this invention.

DETAILED DESCRIPTION OF EXEMPLARY EMBODIMENTS

Figure 1:
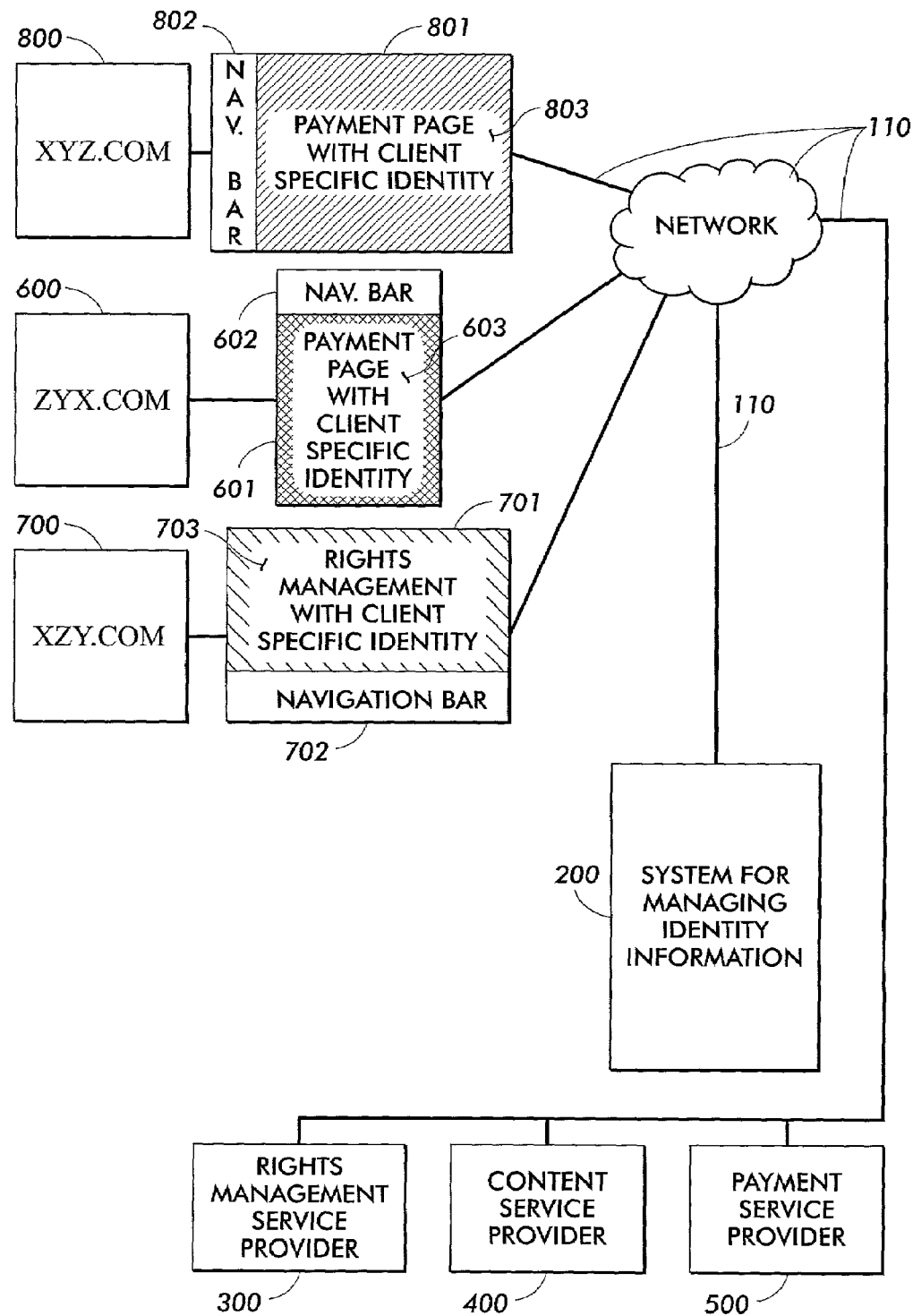
FIG. 1 shows an exemplary embodiment of a system for managing identity information according to this invention.

FIG. 1 is an exemplary embodiment of a system for managing identity information 200 connected over communication links 110 to one or more third party application service providers 300–500 and to one or more client web sites 600, 700 and 800. Each client web site 600, 700 and 800 contains out-sourced pages 601, 701 and 801 respectively. Each of the client web site pages 601, 701 and 801 are composed of elements such as navigation bars 602, 702 and 802 as well as background watermarks or logos 603, 703 and 803. The navigation bars may in turn be comprised of elements. The system for managing identity information 200 provides flexible and easily expandable integration of content from one or more content providers 300–500 with the identity or look and feel of the one or more referring web sites 600–800. However, it will be apparent that the content provider may be integrated with the system for managing identity information 200.

For example, requests for a payment content portion or web page from the XYZ referring client web site 800 is mediated by the system for managing identity information 200. The system for managing identity information 200 requests content information from the payment service provider 500 relating to the payment transaction. The system for managing identity information 200 integrates the content provider information from the payment service provider 500 with identity information specific to the XYZ referring client web site 800. Integration of the third-party content information and the XYZ referring client web site 800 is thus maintained. The end-user experience of the look and feel of the XYZ referring client web site 800 is maintained. Since the look and feel are maintained, the end user is able to find information more quickly and effectively. The identity, look and feel or branding associated with the XYZ referring client web site 800 is also reinforced by the consistent presentation of the XYZ referring client web site identity information. The identity information might include the consistent use of a specific font type and size for headings and text, the use of a consistent set of icons throughout the site, consistent placement and usage of a corporate logo and the consistent placement, orientation and composition of a navigation bar and watermark image information. However, any known or later-developed content element and presentation information may be used in the practice of this invention.

For example, the identity of XYZ referring client web site 800 can include for example, the vertical orientation of the navigation bar 802. The identity may comprise the elements making up the navigation bar 802, such as whether a "home" button is included as well as whether the navigation bar 802 supports moving to a parent node in the web site, moving to the last entry and or supports buttons for the "service" and "products" offered by XYZ.

The payment page 801 of the XYZ referring client web site 800 is provided with a consistent identity or consistent look and feel by the system for managing identity information 200. The system for managing identity information 200 uses referring client identifying information, such as the client internet protocol address information contained in an hypertext transfer protocol request to determine a client identifier, URL parameters or properties from a user's certificate such as a digital certificate stored in a directory server. In various exemplary embodiments of the system for managing identity information 200, the client identifier is used as an index into identity storage. However it will be apparent that any known or later-developed technique for associating a client with corresponding identity information may be used in the practice of this invention.

The identity storage stores the content elements that make up the determined client and identity, as well as stylesheet information that provides rules for how the content elements should be presented. The system for managing identity information 200 merges the skeleton or virtual content element information with the third-party content information, and applies the determined stylesheet to generate a resulting merged content portion.

For example, the identity associated with the XYZ referring client web site 800 includes the vertically oriented navigation bar 802 and a background image 803 which are applied to the merged content portion 801. In this way, the identity or look and feel of the XYZ referring client web site 800 is maintained, even when payment service provider 500 provides the payment processing content information.

Similarly, a second referring web site 600 for ZYX Corporation shows a navigation bar 602 oriented horizontally across the top of the payment merged content portion 601. The payment merged content portion 601 merges the identity content elements, such as the navigation bar 602 and the ZYX specific watermark 603, from the identity storage of the system for managing identity information 200, with the payment service provider 500 content information. The stylesheet information stored in the identity storage and associated with the second referring web site for ZYX Corporation is then applied to create the payment merged content portion 601 which has the identity or look and feel of the client web site.

The XZY referring client web site 700 makes use of a rights management application provided by the rights management service provider 300. When a user attempts to access the rights management web page 701 of the XZY referring client web site 700, the request is forwarded over one or more of the communication links 110 to the system for managing identity information 200. The system for managing identity information 200 uses client identifying information, such as the referrer entry of the referring web site 700 in an hypertext transfer protocol request header URL information, a cookie file, a user certificate or any other known or later-developed method, to determine the client identifier information.

The client or user identifier information is then used to determine the relevant skeletal or virtual content elements and the relevant stylesheet to be applied for the XZY referring client web site 700. For example, the elements making up a navigation bar 702, as well as the placement and orientation of the navigation bar 702 and a specified background element 703, are determined from the identity storage of the system for managing identity information 200 for the XZY referring client web site 700. In this way, information stored in the same content elements and stylesheet information are consistently applied based on the XZY referring client web site 700.

Figure 2:
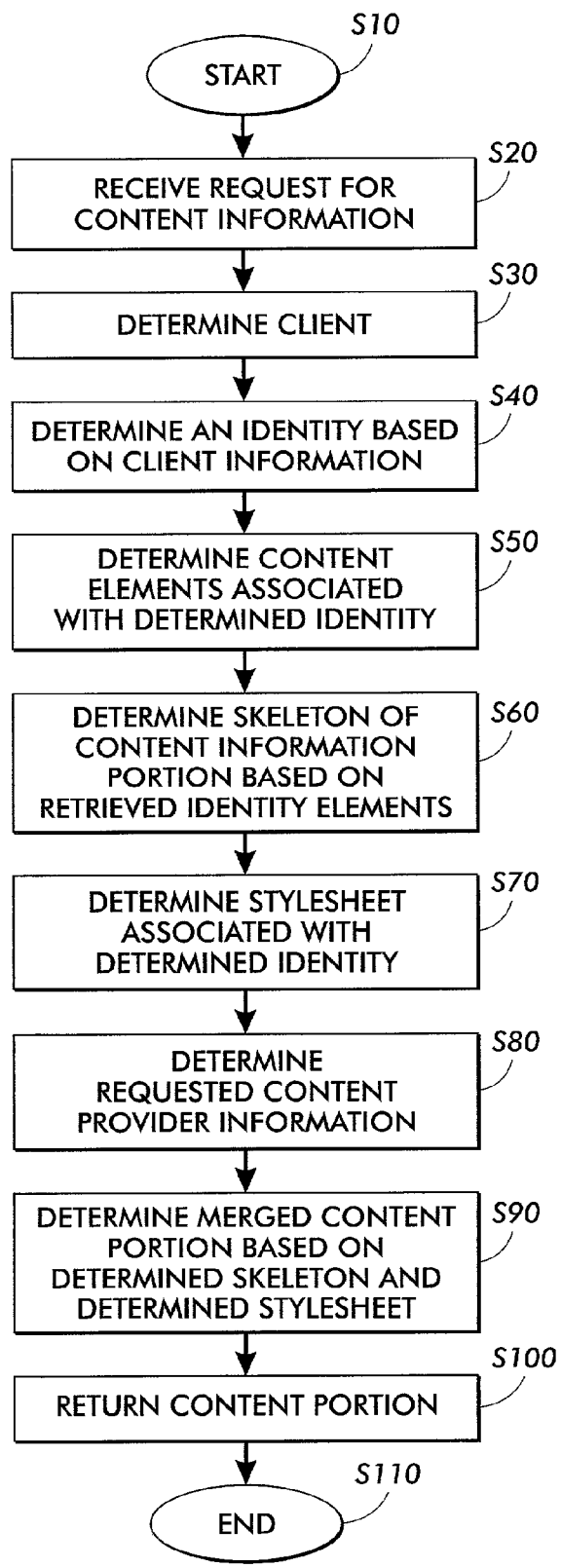
FIG. 2 shows a flowchart outlining an exemplary embodiment of a method for managing identity information according to this invention.

FIG. 2 shows one exemplary embodiment of a method for managing identity information. The process starts at step S10 and continues to step S20, where a request for content information from a client is received. The request may be in the form of a hypertext transfer protocol request, a wireless access protocol request or any other known or later-developed technique for requesting content information. Then, in step S30, the client is determined. The client may be determined by examining the http referrer entry in the http request, by examining session identifier information, by examining DNS information associated with the referrer internet protocol entry information, or using any other known or later-developed method of determining a client. Operation continues to step S40.

In step S40, the identity associated with the client information is determined. In an exemplary embodiment according to this invention, an identity is determined based on the client information and can be inferred or determined from the client content information request. However, it will be apparent that any known or later-developed method of associating identity information with a client request may be used, such as a session identifier, internet protocol address information lookup, or any other known or later-developed technique of associating a client request with the information in the client identity storage.

Next, in step S50, the specific content elements used to make up or provide the identity, or look and feel, are determined based on the determined client. For example, the content elements may be stored in a database or a memory store and indexed based on the client/user internet protocol address information or domain name information. The determined client information is used to determine which specific content elements make up the client identity. These client identity elements can include, but are not limited to, icons used in a content portion, watermarks associated with the content portion, a navigation bar and the elements associated with the navigation bar, font types and sizes as well as elements specifying voice, sound, taste, smell or any other known or later-developed type of content element.

Then, in step S60, a skeleton or virtual content portion is created based on the identity elements retrieved in step S50. The skeleton or virtual content portion reflects the content elements determined to be associated with the determined client. For example, the skeleton or virtual content portion can be a virtual xml record in which the virtual record content elements are based on a determined client. Operation then continues to step S70.

In step S70, the presentation stylesheet for the determined content elements is determined based on the client information. The presentation stylesheet provides display information to determine how each content element should be displayed. Then, in step S80, the third-party content provider information is retrieved. The third-party content provider information may include, but is not limited to, information from databases or services, such as payment processing, rights management, invoicing, content provisioning, human resources processing or any other service or information capable of being provided by third parties. Operation then continues to step S90.

In step S90, the merged content portion is determined based on the skeleton or virtual content portion containing the content elements associated with the client and the third-party content provider information. The determined style sheet information associated with the client is then applied to create a resulting merged content portion. The resulting merged content portion includes the identity or look and feel of the referring client web site. Next, in step S100, the merged content portion is returned to the client and the process ends.

Figure 3:
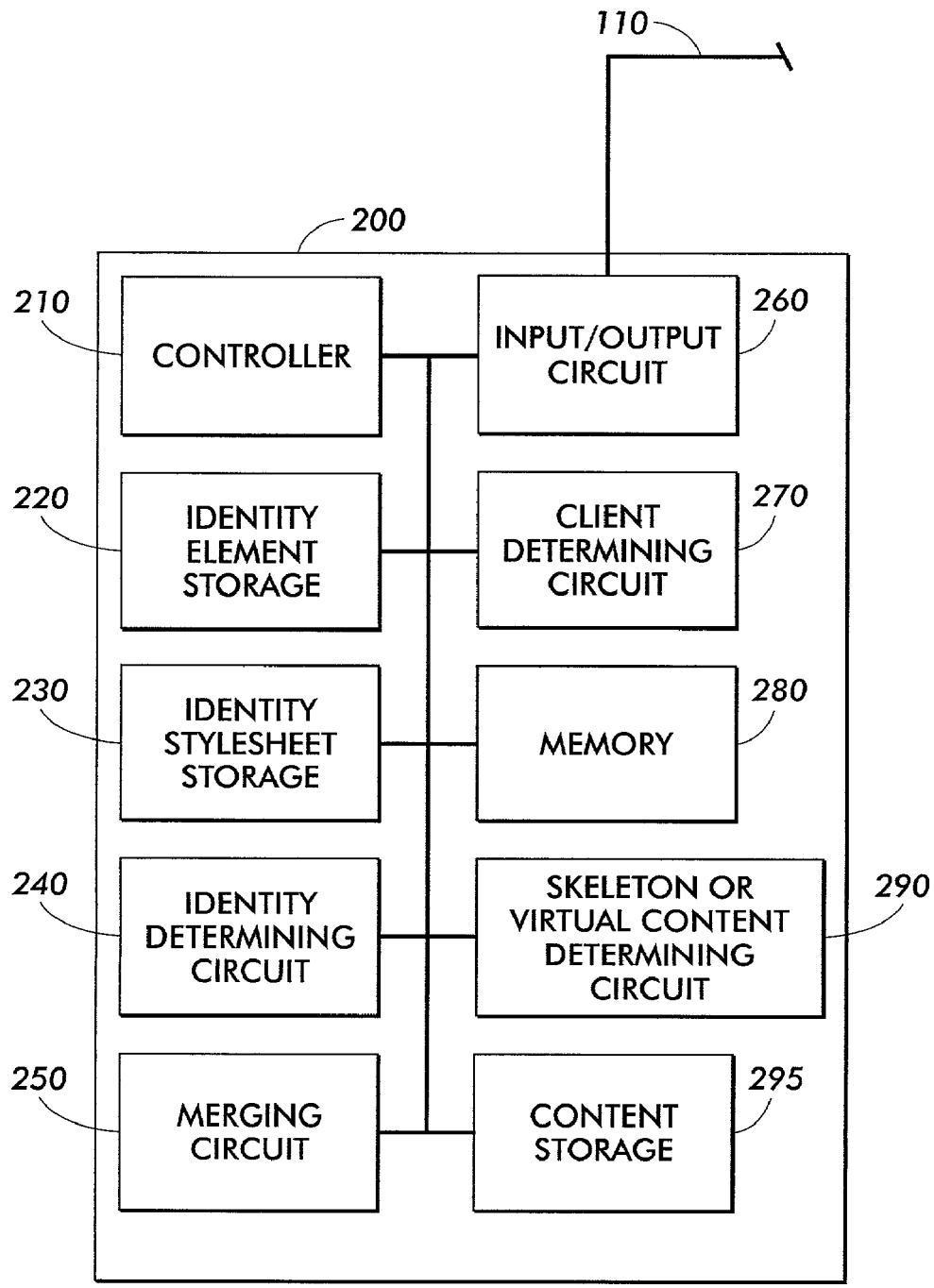
FIG. 3 shows in greater detail a first exemplary embodiment of the system for managing identity information of FIG. 1 according to this invention.

FIG. 3 shows in greater detail a first exemplary embodiment of the system for managing identity information 200 of FIG. 1. As shown in FIG. 1, this first exemplary embodiment of the system for managing identity information 200 comprises a controller 210, an identity element storage 220, an identity stylesheet storage 230, an identity determining circuit or software routine or element 240; a merging circuit or software routine or element 250; an input/output circuit or software routine or element 260 connected to communication link 110; a client determining circuit or software routine or element 270; a memory 280; a skeleton or virtual content element determining circuit or software routine or element 290 and optional content storage 295.

The controller 210 activates the input/output circuit or software routine or element 260 to receive a request for a content portion provided by a content provider. The client determining circuit or software routine or element 270 is activated to determine the client associated with the request. For example, the client may be determined from the referrer portion of an http header request. In various alternative embodiments according to this invention, a session identifier may be included in the http information passed by the referring client, an Internet protocol address lookup may be performed, a directory lookup service may be performed or any other known or later-developed method of determining a client may be used.

The client information determined by the client determining circuit or software routine or element 270 is used to determine the content elements associated with each referring client identity. For example, the determined client information is be used to determine the content elements associated with a site specific navigation bar, and/or background colors or images and/or watermarks to be placed on each page, as well as content elements associated with icons used on the content portion and/or a corporate logo, or any other displayed element that provides the identity or look and feel of the web site.

The content elements associated with each referring client identity are stored in the identity element storage 220. The skeleton or virtual content determining circuit or software routine or element 290 determines which of the stored content elements correspond to the determined identity of the referring client. It will be apparent that the identity element storage 220 may be implemented using memory, disk storage or any other known or later-developed technique for storing information based on the client information.

The identity stylesheet storage 230 stores stylesheet information describing how each identity content element is to be displayed. In various other embodiments, the identity stylesheet storage 230 stores an extensible style sheet in a database, a memory or any other known or later-developed storage apparatus or structure based on the determined client information. When a request is received, the identity stylesheet information associated with the referring client is made available. It shall be appreciated that, in various other exemplary embodiments, the identity stylesheet may be stored with the content elements in a single storage without departing from the scope of this invention.

For each client, the one or more identity content elements stored in the identity content element storage 220 and the identity stylesheet stored in the identity stylesheet storage 230 combine to form the identity associated with that client. The identity content elements are applied to a skeleton or virtual content record, along with the identity stylesheet. The identity stylesheet determines the presentation of the data in the skeleton or virtual content record. For example, the identity may be implemented using two components with the content element components specified in, for example, an extensible mark-up language (XML) record. The positioning of those components may be specified in, for example, an extensible stylesheet language (XSL) record.

The controller 210 activates the input/output circuit or software routine or element 260 to request content provider information from the third-party content provider. The third-party content provider information is received by the input/output circuit 260. Alternatively, the content provider information may be obtained from the content storage 295. For example, content information may be pre-loaded into the content storage 295, which could be implemented using a database, a memory device, ROM or any other type of storage. The requested content provider information may then be retrieved directly from the content storage 295, reducing the time necessary to respond to a request.

The skeleton or virtual content elements associated with the client, the third-party content provider information and the style sheet information associated with the client are merged by the merging circuit or software routine 250 according to the style sheet to create a merged content portion, with the identity or look and feel of the client, in the memory 280. The merged content portion saved in the memory 280 is then transferred by the input/output circuit or software routine or element 260 over one or more of the communication links 110 to the referring site (not shown).

Figure 4:
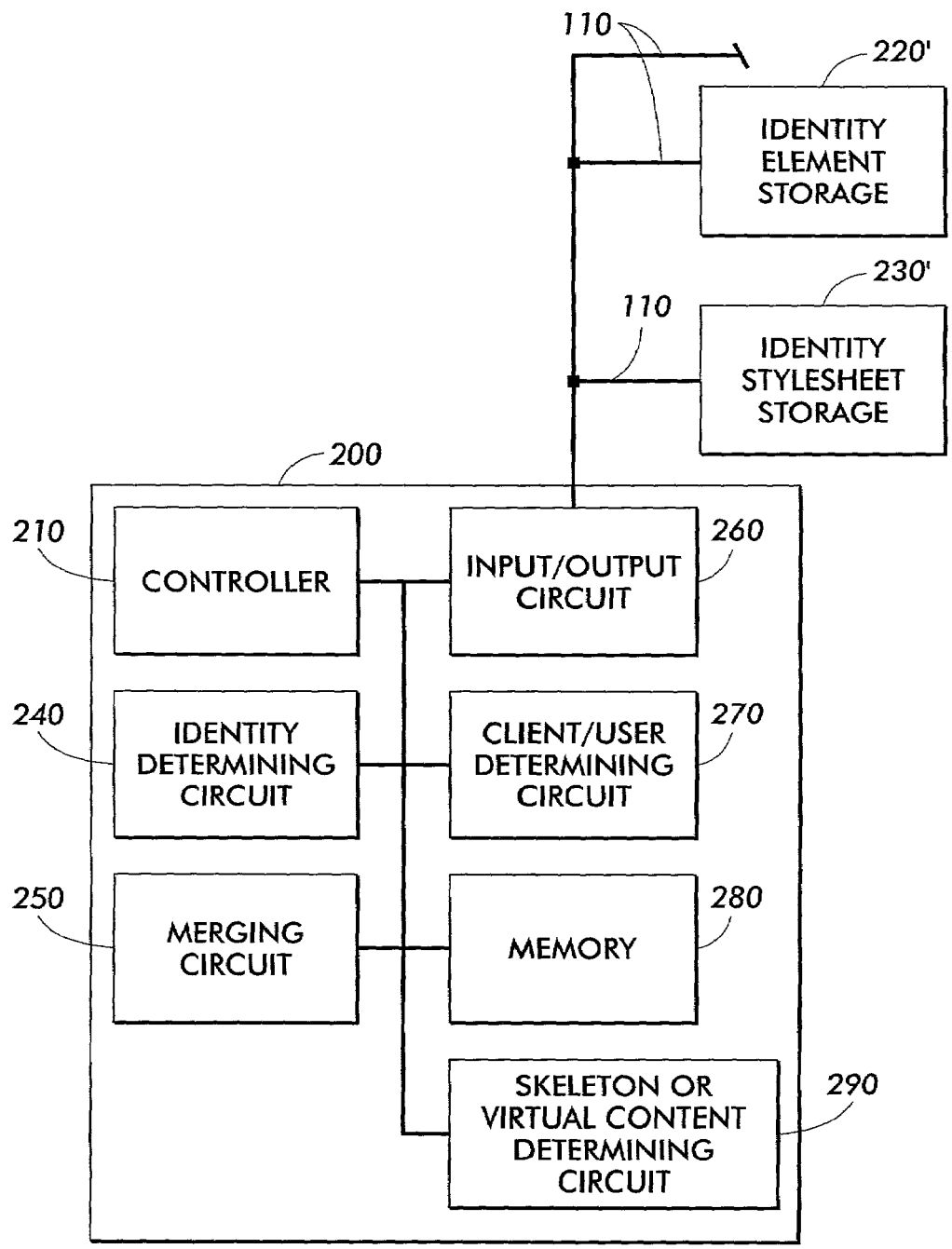
FIG. 4 shows in greater detail a second exemplary embodiment of the system for managing identity information of FIG. 1 according to this invention.

FIG. 4 shows a second exemplary embodiment of the system for managing identity information of 200 of FIG. 1 according to this invention. As shown in FIG. 4, the second exemplary embodiment of the system for managing identity information 200 comprises the controller 210, the identity determining circuit 240, the merging circuit 250, the client determining circuit 270, the memory 280, the skeleton or virtual content determining circuit 290 and the input/output circuit 260, all connected over one or more communications links 110 to a remotely located identity element storage 220 and to a remotely located identity stylesheet storage 230.

In the second embodiment of the system for managing identity information 200 of FIG. 1 according to this invention, the remotely located identity element storage 220' and the remotely-located identity stylesheet storage 230' are accessible by the system for managing identity information 200 over the one or more communication links 110. It will be apparent that the remotely-located identity element storage 220 and the remotely-located identity stylesheet storage 230 can be located anywhere within a networked environment that provides access over one or more of the communication links 110 to the system for managing identity information 200 of FIG. 1. In alternative exemplary embodiments (not shown), cached copies of the remotely-located identify element storage 220' and the remotely-located identity stylesheet storage 230' may be cached or replicated to cache servers located closer to a client or may be placed within the network of large internet service providers, such as America Online.

Figure 5:
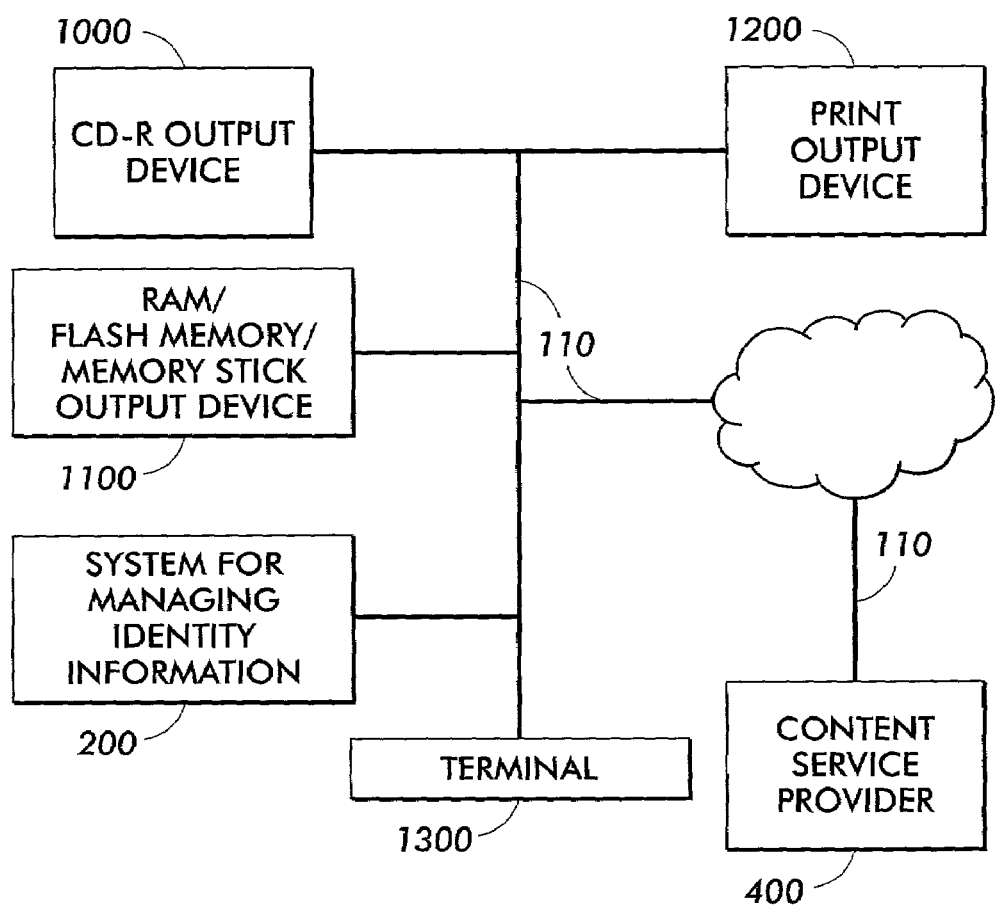
FIG. 5 shows in greater detail a third exemplary embodiment of the system for managing identity information of FIG. 1 according to this invention.

FIG. 5 shows a third embodiment of the system for managing identity information 200 of FIG. 1 according to this invention. As shown in FIG. 5, this third exemplary embodiment of the system for managing identity information 200 is connected over one or more of the communications links 110 to a content provider 400; a RAM/flash memory output device 1100; CD-R output device 1000; a print output device 1200 and/or a terminal 1300.

A request for a digital, audio or text file is entered on the terminal 1300 and forwarded to the system for managing identity information 200, as shown in FIG. 5. The referring client may be specified as any one or more of the store or vendor in which the terminal is located, a target device code or identifier, a user identifier, and/or a membership number. The client identifier may be entered directly to specify the identity to be applied to the content information from the content provider. The system for managing identity information 200 constructs a merged content portion based on the identity information associated with the client information and the content provider 400. The merged content portion may be output to the RAM/flash memory output device 1100. In this way, the identity may be applied to an entire electronic text file, while the navigation controls suitable for the target device may be added with a consistent identity or look and feel.

Similarly, the CD-R output device 1000 may be selected and the relevant identity applied to provide identity and look and feel for reading a book on a computer or listening to an audio file in a CD playback device.

The print output device 1200 may be selected and an appropriate identity specified using the client identifier from the terminal 100 to provide a consistent identity or look and feel to be applied to the content portion provided by the content provider service 400. For example, the digital content of a book can be formatted with client specific information. A book printed at a bookseller can be printed using a bookseller specific collection style. The bookseller specific collection style may be further customized to the bookseller's community or to individual groups or affiliations within a community.

The system for managing identity information 200 can also be used to provide consistent identity or look and feel for content offered by service organizations, faith-based organizations, hobby groups, professional societies or any other organization seeking to establish an identity relationship with the content or content service provider. Individual users may also use the system to design their own distinctive library identity. For example, the content from the content service provider can be merged with the individual user's identity to create printed books for the user's personalized library.

The system for managing identity information 200 provides a flexible and efficient system for managing identity with any type of content. For example, interactive audio books for the visually impaired and/or customized printed professional society books or e-books designed for reading on a personal digital assistant may be generated as merged content portions from the same content information provided by content service provider 400. Different types of merged content can be created based on the client affiliations.

The identity information may include content elements such as navigation elements, commands to navigate within the material or may include the consistent use of sounds or phrases as prompts to change media. In various alternative embodiments, a particular voice may be associated with the audio book content or different voices may be applied to the audio book content depending on the speaker in the text. The merged content incorporating the identity and or look and feel may be transferred to RAM and/or ROM, Memory Stick® diskette or any other known or later-developed storage medium capable of holding the information.

FIG. 6 shows an exemplary data structure 900 for identity element storage 220 or 220' according to this invention. The exemplary data structure usable by the 900 comprises a client identifier portion 910 and a content element portion 920.

The client identifier portion 910 stores information that identifies the referring client to the system for managing style information 200. For example, in the first line of the exemplary data structure for identity element storage 600, the domain name "www.xyz.com" is used as the client identifier portion 601.

The content element portion 602 of the exemplary data structure 900 stores the content element information associated with each determined client. Thus, the navigation bar and associated content elements are indicated as being associated with client "www.xyz.com".

Similarly, the second line of the exemplary data structure 900 indicates that the background image "logo.png" found in the xyz subdirectory specified in the content element portion 920 is associated with a "www.xyz.com" client identifier portion 910. The third line content element portion 602 indicates that the submit button should be associated with the custom image "go.png" found in the xyz directory and associated with the client identifier "www.xyz.com".

The fourth line of the exemplary data structure 900 uses the internet protocol address "140.147.254.3" as the client identifier portion 910 and associates it with a submit button that uses the image "go.png" in the loc directory as indicated in the content element portion 920.

The fifth line of the exemplary data structure 900 uses a name and/or value string "client_id=327468" as the client identifier portion 910 and associates it with a submit button that uses the image "go.png" in the zzz directory, as indicated in the content element portion 920.

It will be apparent that session information, cookie information, a unique identifier or any other known or later-developed method of identifying a client may be used to determine the content elements associated with a given identity in the exemplary data structure 900.

FIG. 7 shows an exemplary data structure 950 usable by the identity stylesheet storage 230 or 230'. The exemplary data structure 950 comprises the client identifier portion 901 and a stylesheet portion 903.

For example, the client identifier portion 901 of the first line indicates that stylesheet specified in the stylesheet portion 903 is associated with client "www.xyz.com". The stylesheet specifies that the Arial font type is to be used.

The stylesheet portion 903 of line 2 is associated with the client having the domain name "www.zyx.com". The stylesheet stored in line 2 of the stylesheet portion specifies that the Times Roman font type is to be used. Similarly, the stylesheet portion 903 of line 3 is associated with the domain name "www.xzy.com", as indicated in the client identifier portion 901. The stylesheet specifies that the Bookman type face should be used. It will be apparent that session information, cookie information, a unique identifier or any other known or later developed method of identifying a client may be used to determine the stylesheet associated with a given identity in the exemplary data structure for identity stylesheet 900.

In the various exemplary embodiments outlined above, the system for managing identity information 200 can be implemented using a programmed general purpose computer. However, the system for managing identity information 200 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 2, can be used to implement the system for managing identity information 200.

Each of the circuits or software routine or elements 210–295 of the various exemplary embodiments of the system for managing identity information 200 outlined above can be implemented as portions of a suitably programmed general purpose computer. Alternatively, each of circuits or software routine or elements 210–295 of the various exemplary embodiments of the system for managing identity information 200 outlined above can be implemented as physically distinct hardware circuits within an ASIC, or using a FPGA, a PDL, a PLA or a PAL, or using discrete logic elements or discrete circuit elements. The particular form each of the circuits or software routine or elements 210–290 of the various exemplary embodiments of the system for managing identity information 200 outlined above will take is a design choice and will be obvious and predicable to those skilled in the art.

Moreover, the various exemplary embodiments of the system for managing identity information 200 and/or each of the various circuits or software routines or elements discussed above can each be implemented as software routines, managers or objects executing on a programmed general purpose computer, a special purpose computer, a microprocessor or the like. In this case, the various exemplary embodiments of the system for managing identity information 200 and/or each of the various circuits or software routine or elements discussed above can each be implemented as one or more routines embedded in the communications network, as a resource residing on a server, or the like. The various exemplary embodiments of the system for managing identity information 200 and the various circuits or software routine or elements discussed above can also be implemented by physically incorporating the system for managing identity information 200 into a software and/or hardware system, such as the hardware and software systems of a web server or a client device.

As shown in FIGS. 3 and 4, the memory 280, the identity element storage 220 and/or 220', the identity stylesheet storage 230 and/or 230' and the content storage 295 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 110 shown in FIGS. 1 and 3–5 can each be any known or later-developed device or system for connecting a communication device to the system for managing identity information 200, including a direct cable connection, a connection over a wide area network or a local area network, a connection over an intranet, a connection over the Internet, or a connection over any other distributed processing network or system. In general, the communication links 110 can be any known or later-developed connection system or structure usable to connect devices and facilitate communication Further, it should be appreciated that the communication links 110 can be a wired or wireless links to a network. The network can be a local area network, a wide area network, an intranet, the Internet, or any know or later-developed other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A system for managing identity information in a merged content portion, comprising:
   an identity storage that stores identity information including content elements and style sheet information, associated with a plurality of referring clients and a user;
   a client and user determining circuit that determines a first object representing a particular one of the plurality of referring clients and a user of a received request for information from an information provider;
   a skeleton/virtual content determining circuit that determines which of the stored identity information and the style sheet information correspond to the particular referring client and the user to automatically create a skeleton/virtual content record based on the determined stored identity information and style sheet information;

an input/output circuit that requests and receives the information from the information provider; and a merging circuit that automatically determines the merged content portion based on the information received from the information provider and the created skeleton/virtual content record and merges the merged content portion into the created skeleton/virtual content record to create a second object different from the first object, the created second object is outputted to the particular referring client and the user to maintain a look and feel of a particular referring client website.

2. The system of claim 1, wherein the identity storage comprises identity content element storage and identity presentation information storage.

3. The system of claim 1, wherein the client and user determining circuit determines at least one of a referring client identification and a user identification based on at least one of internet protocol address information, session identifier information, name pairs and value pairs and the identity storage indexes the stored identity information by at least one of the client identification and the user identification.

4. The system of claim 1, wherein the merged content portion is stored using at least one of an electronic medium, a printed medium and a paper medium.

5. The system of claim 1, wherein the merged content portion is at least one of an interactive electronic text, a printed text, an audio book and a video book.

6. A method for managing identity information, comprising:

storing identity information including content elements and style sheet information associated with a plurality of referring clients and a user in a repository;

receiving an information request from at least one of a referring client and a user;

determining an object representing at least one of the referring client and the user associated with the information request;

receiving requested information from an information provider;

determining identity information from the information stored in the repository based on the at least one of the referring client and user;

automatically creating a skeleton/virtual content record based on the determined identity information and style sheet information of the at least one of the referring client and user;

automatically determining a merged content portion based on the received information and the skeleton/virtual content record;

merging the merged content portion into the skeleton/virtual content record to create a second object different from the first object; and outputting the second object to the referring client and the user to maintain a look and feel of a referring client website.

7. The method of claim 6, wherein the stored identity information comprises at least one of identity content element information and identity presentation information.

8. The method of claim 7, further comprising storing the merged content portions on at least one of electronic media, printed media and a paper media.

9. The method of claim 6, wherein determining the client and user identity information is based on at least one of internet protocol address information, session identifier information, name pairs and value pairs and the stored information is indexed by the identity information.

10. The method of claim 6, wherein determining the merged content portions produces at least one of an interactive text, a printed text, an audio book and a video book.

11. A system for managing identity information in a merged content portion, comprising:

an identity storage for storing identity information, including content elements and style sheet information, associated with a plurality of referring clients and a user, the identity information including a referring client identifier portion and an associated content element portion;

a client and user determining circuit for determining a first object representing the referring client and the user of a received request signal for information from an information provider;

a skeleton/virtual content for determining circuit that determines which of the stored identity information and the style sheet information correspond to the referring client and user based on the referring client identifier portion to automatically create a skeleton/virtual content record based on the determined stored identity information and the style sheet information;

an input/output circuit for requesting and receiving an information signal from the information provider;

a merging circuit for automatically determining the merged content portion based on a received information signal and the skeleton/virtual content record that includes an identity associated with the determined client and user to merge the merged content portion into the skeleton/virtual content record to create a second object different from the first object, and the second object is outputted to the referring client and the user to maintain a look and feel of a referring client website.

12. The system of claim 11, wherein the identity storage comprises identity content element storage and identity presentation information storage.

13. The system of claim 11, wherein the client and user determining circuit determines the referring client and user identifier based on at least one of internet protocol address information, session identifier information and name and value pairs.

14. The system of claim 11, wherein the merged content portion is stored on at least one of an electronic media, a printed media and a paper media.

15. The system of claim 11, wherein the merged content portion is at least one of an interactive electronic text, a printed text, an audio book and a video book.

16. A method for managing the look and feel of a web site, comprising:

providing an identity storage repository for storing identity information, including content elements and style sheet information, associated with a plurality of referring clients and a user, the identity information including a referring client identifier portion and an associated content element portion;

receiving a first object representing an information request from the user;

determining an identity of a particular referring client associated with the information request;

determining content elements and presentation elements associated with the referring client from the identity storage repository;

retrieving the requested information from an information provider;

automatically creating a skeleton/virtual content record based on the content elements and the presentation elements of the particular referring client;

merging the retrieved requested information and the skeleton/virtual content record to create a second object representing a document consistent with the content elements and presentation elements associated with the particular referring client; and outputting the document to the user.

* * * * *